United States Patent [19]

Wang

[11] Patent Number: 4,799,702
[45] Date of Patent: Jan. 24, 1989

[54] SCOOTER WITH TURNABLE REAR WHEEL

[76] Inventor: Tarrassa Wang, No. 2, Lane 143, Hsueh Shih Rd., Taichung City, Taiwan

[21] Appl. No.: 192,488

[22] Filed: May 11, 1988

[51] Int. Cl.$^4$ ............................................. B62K 9/00
[52] U.S. Cl. ............................................... 280/87.041
[58] Field of Search ............... 280/11.22, 11.23, 11.25, 280/87.02 R, 87.04 R, 87.04 A

[56] References Cited

U.S. PATENT DOCUMENTS

| | | | |
|---|---|---|---|
| 1,150,773 | 8/1915 | La Chall | 280/87.04 A |
| 1,387,675 | 8/1921 | Worobow | 280/87.04 R |
| 2,330,147 | 9/1943 | Rodriguez | 280/87.04 R |
| 2,474,946 | 7/1949 | Kinslow | 280/87.04 A |
| 3,620,547 | 11/1971 | Vaverek | 280/87.04 A |
| 4,555,122 | 11/1985 | Harvey | 280/87.04 R |

Primary Examiner—David M. Mitchell
Assistant Examiner—Michael Mar
Attorney, Agent, or Firm—Knobbe, Martens, Olson & Bear

[57] ABSTRACT

A scooter comprises a flexible attachment means which includes a longitudinal rod secured to a foot board of the scooter, a joint member having a front portion pivotally connected to the longitudinal rod for turning about a vertical axis, a U-shaped wheel carrying member connected to a rear portion of the joint member, a restraining bar transversely attached to the front portion of the joint member and two helical springs each of which has one end connected to the front end of the longitudinal rod and the other end connected to one of the ends of the restraining bar. The restraining bar and the springs provides a degree of controlling effect for limiting the turning movement of the rear wheel.

4 Claims, 3 Drawing Sheets

SCOOTER WITH TURNABLE REAR WHEEL

BACKGROUND OF THE INVENTION

This invention relates to a scooter and particularly to a scooter having a rear wheel which is attached to a foot board through a flexible attachment means.

It is known that a scooter includes an elongated narrow foot board connected to a front wheel and a rear wheel and an upright handle to steer the front wheel. Typically, the rear wheel is attached to a rigid rear fork extending from the foot board so that it can not turn right or left relative to the foot board and the rear portion of the foot board is considerably less active than the front part of the foot board during the operation of the foot board.

SUMMARY OF THE INVENTION

An object of the invention is to provide a scooter with a flexible attachment device for attaching a rear wheel to the foot board of the scooter so that the rear portion of the scooter can move more actively than that of the conventional scooter.

Another object of the invention is to provide an active scooter by which the user can slalom with a large amount of body movement to achieve a maximum exercising effect as well as an amusing effect.

According to the present invention, a scooter which has a foot board connected with a rear wheel and a steerable front wheel comprises a flexible attachment means for attaching the rear wheel to the foot board. The attachment means includes a longitudinal horizontal rod secured to the bottom side of the rear portion of the foot board, a joint member having a front portion pivotally connected to the rear end of the rod for turning about a vertical axis, the front portion of the joint member having a restraining bar which is attached immovably thereto and which extends transversely relative thereto, the restraining bar having two opposite ends both terminating at a point away from the front portion of the joint member, and a substantially U-shaped wheel carrying member for holding the rear wheel, having two arm members and an intermediate portion interconnecting the arm members, the intermediate portion being connected to the rear portion of the joint member, and a resilient means connected to the front end of the longitudinal rod and also connected to the ends of the restraining bar.

The present exemplary preferred embodiment will be described in detail with reference to the following drawings, in which

DETAILED DESCRIPTION OF THE PREFERRED EMBODIMENT

Figure 1:
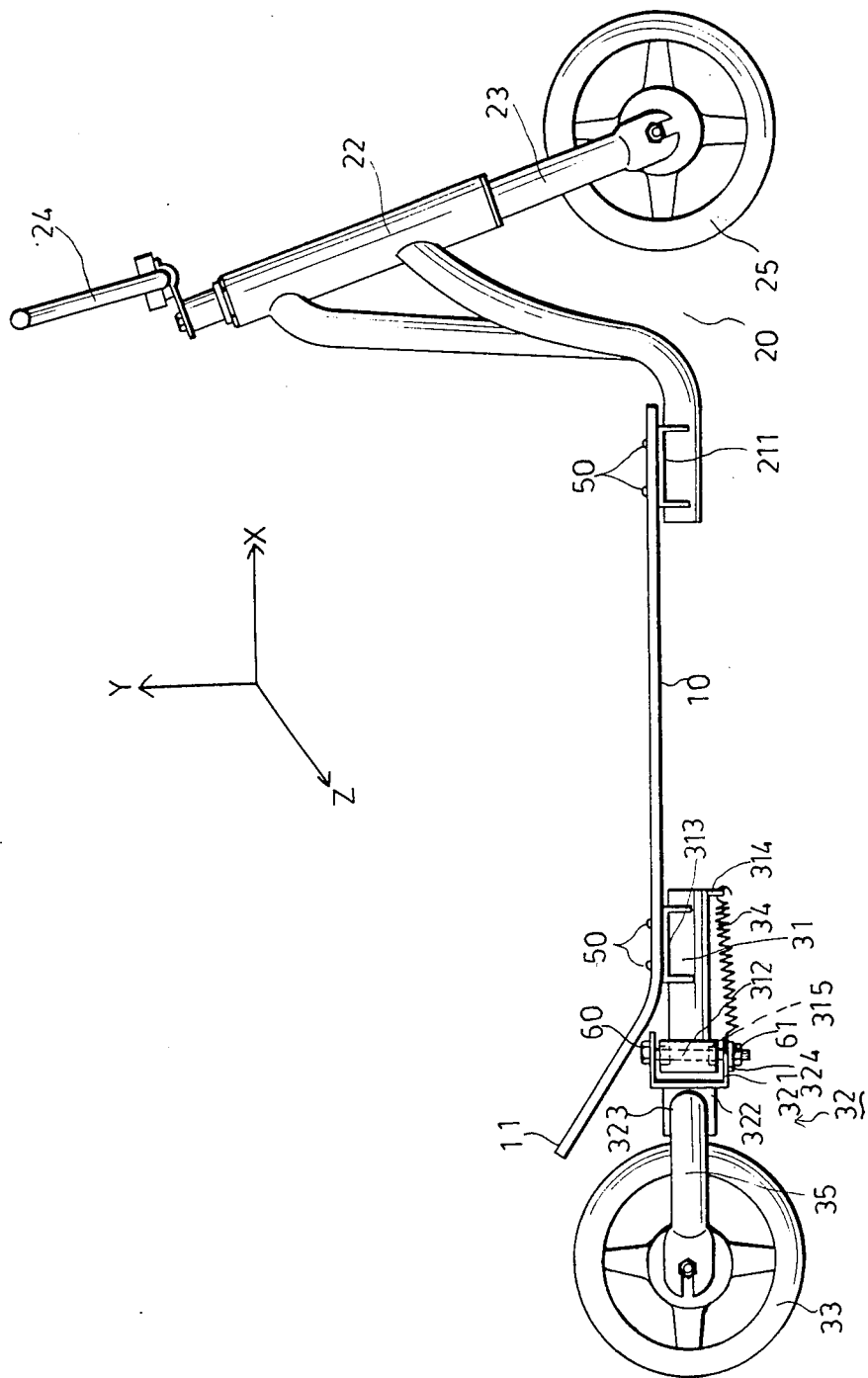
FIG. 1 is a schematic elevation view of a scooter incorporating the present invention.
Figure 2:
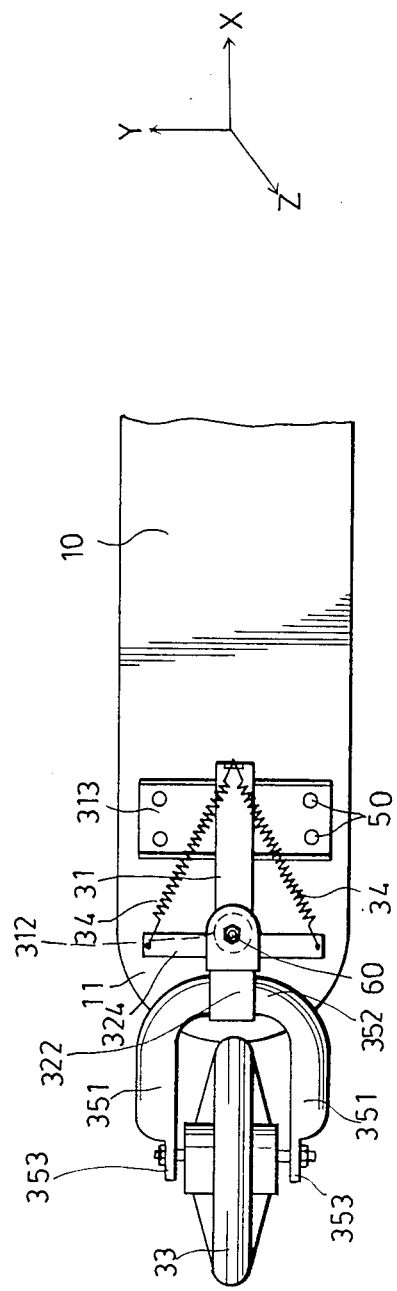
FIG. 2 is a fragmentary plan view of the scooter of FIG. 1.
Figure 3:
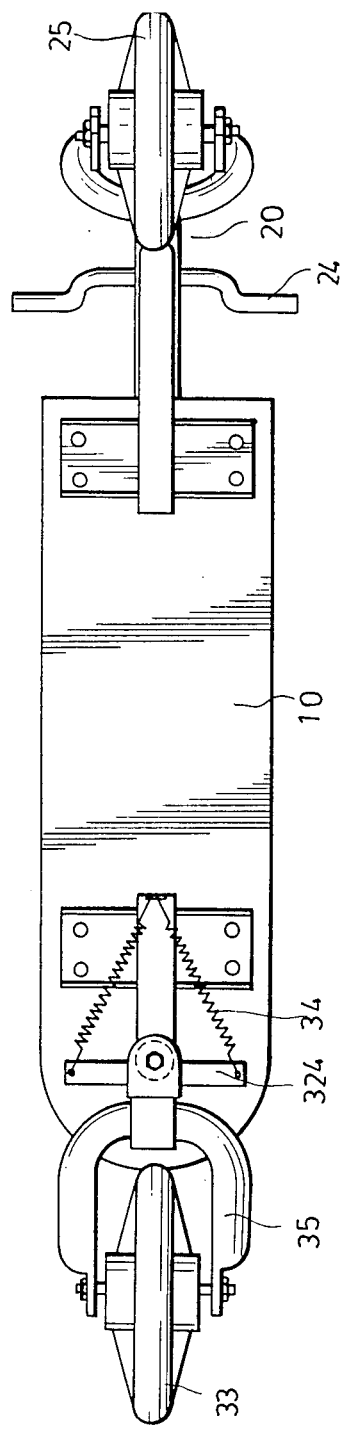
FIG. 3 is a plan view showing how the rear wheel performs when the scooter moves straight.
Figure 4:
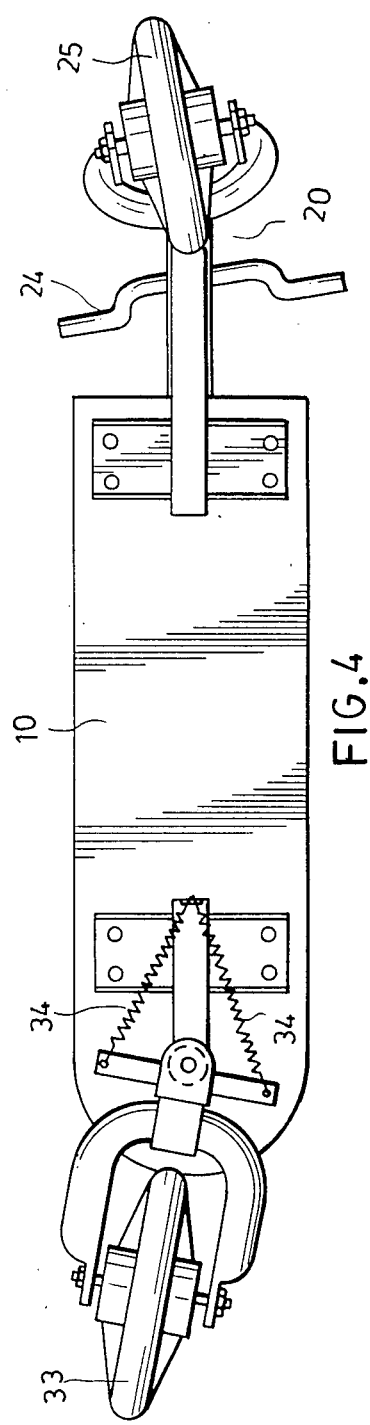
FIG. 4 is a plan view showing how the rear wheel performs when the scooter turns.

Referring to the drawings, a scooter is shown, having a foot board 10 and a front frame portion 20. The front frame portion 20 has a front attachment plate 211 which is secured to the foot board 10 through screws 50. The front frame portion 20 has a tube 22 which receives and holds an upright handle tube 23 having two grip portions 24. A front wheel 25 is attached to the bottom end of the handle tube 23.

A horizontal rod 31 is attached longitudinally to the rear portion of the foot board 10 by means of an attachment plate 313 and screws 50. At the rear end of the rod 31 is a lobe 312 which extends below the upward inclined portion 11 of the foot board 10.

A one-piece joint member 32 is provided, having a front U-shaped portion 321 and a rear portion 322 having a through-hole 323. The U-shaped portion 321 extends over the top and the bottom of the rear lobe 312 and is connected pivotally thereto by means of a bolt 60 which is inserted into a bore 315 of the lobe 312 and a nut 61, thereby permitting the U-shaped portion 321 to turn about a vertical axis relative to the rod 31. The U-shaped portion 321 of the joint member 32 further has a horizontal restraining bar 324 which is transverse to and securely attached to the bottom side of the U-shaped portion 321.

A substantially U-shaped wheel carrying member 35 is threaded through the hole 323 of the rear portion 322 of the joint member 32. A rear wheel 33 is mounted on the arm portions 353 of the U-shaped wheel carrying member 35 for rotation about a horizontal axis.

Two helical springs 34 are provided to restrain the turning movement of the joint member 32 relative to the rod 31. The springs 34 are respectively provided at two sides of the rod 31 and each of them has one end connected to the front end of the rod 31 and the other end connected to one of the ends of the transverse restraining bar.

The rear wheel arranged as described hereinabove enables the player to make active body movement when he rides on the scooter board and twists his body or when he slaloms. The restraining bar 324 and the springs 34 provide a degree of controlling effect so as to limit the turning angle of the joint member 32 during manipulation by the user.

With the invention thus explained, it is apparent that various modifications and variations can be made without departing from the scope of the invention. It is therefore intended that the invention be limited as indicated only in the appended claims.

What I claim is:

1. A scooter comprising:
   a frame having a longitudinal foot board and a steering assembly including an upright handle extending in front of said foot board;
   a front wheel operably connected to said steering assembly;
   a rear wheel;
   a flexible attachment means including a longitudinal horizontal rod fixedly secured to a bottom side of a rear portion of said foot board, said rod having a front end and a rear end, a joint member having a front portion pivotally connected to said rear end of said longitudinal horizontal rod for turning about a vertical axis, said front portion of said joint member having a restraining bar which is transverse to and attached securely to said front portion of said joint member, said restraining bar having two opposite ends both terminating at a point away from said front portion of said joint member, said joint member further having a rear portion, a substantially U-shaped wheel carrying member for holding said rear wheel, said wheel carrying member having two arm members and an intermediate portion interconnecting said arm members, said intermediate portion being connected to said rear portion of said joint member, and a resilient means connected to said front end of said longitudinal horizontal rod and also connected to said ends of said restraining bar.

2. A scooter as claimed in claim 1, wherein said front portion of said joint member has a U-shape and defines a space for receiving said rear end of said longitudinal rod.

3. A scooter as claimed in claim 2, wherein said rear portion of said joint member has a through-hole which has a horizontal axis, said intermediate portion of said wheel carrying member being threaded through said through-hole.

4. A scooter as claimed in claim 1, wherein said resilient means includes two helical springs which are provided respectively on two sides of said longitudinal horizontal rod, each of said springs having two opposite ends respectively attached to said front end of said longitudinal horizontal rod and one of said ends of said restraining bar.

* * * * *